United States Patent [19]
Grove et al.

[11] 3,765,440
[45] Oct. 16, 1973

[54] VALVE CONSTRUCTION

[75] Inventors: Marvin H. Grove, Kee W. Kim, Lyle R. Van Aradale, all of Houston, Tex.

[73] Assignee: M & J Valve Company, Houston, Tex.

[22] Filed: May 5, 1971

[21] Appl. No.: 140,525

[52] U.S. Cl............ 137/246.22, 137/312, 251/172, 251/315, 251/328
[51] Int. Cl............................ F16k 3/02, F16k 5/06
[58] Field of Search.................. 251/170, 172, 174, 251/328; 137/246.11, 246.22

[56] References Cited
UNITED STATES PATENTS

| | | | |
|---|---|---|---|
| 2,796,230 | 6/1957 | Grove et al. | 251/172 |
| 3,166,291 | 1/1965 | Grove | 251/172 |
| 3,306,315 | 2/1967 | Cook | 137/246.22 |
| 3,421,733 | 1/1969 | Stewart | 251/174 X |
| 3,497,177 | 2/1970 | Hulsey | 251/172 |
| 3,617,025 | 11/1971 | Gerbic | 251/172 |

FOREIGN PATENTS OR APPLICATIONS

| | | | |
|---|---|---|---|
| 684,621 | 12/1952 | Great Britain | 251/172 |

*Primary Examiner*—Alan Cohan
*Assistant Examiner*—Richard Gerard
*Attorney*—Flehr, Hohbach, Test, Albritton & Herbert

[57] ABSTRACT

A valve construction (gate or ball) having at least one sealing assembly which normally provides a fluid-tight seal between the body and the valve surface of the gate or ball. The sealing assembly includes a metal ring having sealing means formed of resilient material which engages the valve surface. The ring can be jacked hydraulically against the valve surface to establish a secondary seal. During periods when jacking forces are not applied, the assembly presents a fluid pressure area acted upon by the upstream line pressure whereby the sealing means is urged by line pressure against the valve surface. One embodiment has means for introducing sealing lubricant to the sealing areas of the valve surface. Also one embodiment has means for detecting leakage past the sealing assembly.

4 Claims, 11 Drawing Figures

PATENTED OCT 16 1973 3,765,440

INVENTORS
MARVIN H. GROVE
KEE W. KIM
LYLE R. VAN ARSDALE

By Flehr, Hohbach, Test,
Albritton & Herbert
ATTORNEYS

INVENTORS
MARVIN H. GROVE
KEE W. KIM
LYLE R. VAN ARSDALE

BY Flehr, Hohbach, Test,
Albritton & Herbert
ATTORNEYS

FIG_10A

FIG-10B

VALVE CONSTRUCTION

CROSS-REFERENCE TO RELATED APPLICATIONS

Reference is made to copending U.S. Pat. applications Ser. No. 17,365 filed Mar. 9, 1970 for "Valve Construction and Method," and Ser. No. 21,074 filed Mar. 19, 1970 for "Valve Apparatus Having Leak Detecting Means," and now U.S. Pat. No. 3,641,542 both of said applications showing certain features of the sealing means disclosed herein, and both being assigned to the same assignee as the subject application.

BACKGROUND OF THE INVENTION

Valves have been developed which make use of sealing assemblies having members made of resilient material for establishing sealing contact with the metal valve surfaces (e.g., the side surfaces of a gate or the spherical surfaces of a valve ball.) One recognized difficulty with such valves is that if the resilient sealing members become injured because of breakage, erosion or extreme temperature conditions, it is difficult to establish a secondary seal pending making replacements or repairs. It has been proposed to make use of hydraulic jacking means to force sealing members against the gate or ball, thereby minimizing leakage. Insofar as we are aware, such jacking means have employed fluid pressure areas of the assembly provided particularly for this purpose, thus complicating the construction of the assembly.

In general, there is a need for an improved valve construction having sealing means making use of resilient material which can be effectively jacked against the valve surface of the ball or gate to establish an effective secondary seal, and which will also utilize upstream line pressure to urge the sealing means against the gate or ball during normal service. Also there is need for a valve construction having such features together with provision for detecting leakage when the valve is closed.

SUMMARY OF THE INVENTION

This invention relates generally to the construction of valves suitable for controlling fluid flow, including gases and liquids.

In general, it is an object of the invention to provide an improved valve construction applicable to both gate and ball valves, which incorporates means for effectively jacking a member of the sealing assembly against the valve gate or ball to establish a secondary seal in the event sealing members made of resilient material, which normally establish the seal, become injured because of breakage, erosion, or extreme temperature conditions.

Another object of the invention is to provide a valve construction having a sealing assembly with an annular chamber space adapted to receive upstream line pressure to urge one part of the assembly into sealing engagement with the gate or ball, or to receive a plastic material under pressure whereby the one part of the assembly is hydraulically jacked against the gate or ball.

Another object is to provide a valve construction which has provision for preventing injury due to excessive hydraulic jacking pressure.

Another object of the invention is to provide a sealing assembly for a gate or ball valve which incorporates leak detecting means as well as means for enabling it to be hydraulically jacked against the gate or ball.

In general the present invention is in the form of a gate or ball valve with a body having aligned flow passages and a valve member within the body which is movable between open and closed positions relative to the flow passages. The valve member has at least one valve working surface which surrounds one of the flow passages for closed position of the valve. At least one annular sealing assembly is carried by the body and surrounds said one flow passage to form a seal between the body and the valve member. This assembly includes a relatively rigid metal ring carried by the body and capable of limited movement toward or away from the valve member. The ring is provided with two peripheral surfaces on different diameters which are in interfitting relationship with two peripheral surfaces of the body which likewise are formed on two different diameters. Sealing means are provided between the interfitting surfaces whereby seals are formed on two diameters. The smaller of these two diameters corresponds generally to the mean diameter of the sealing means formed of resilient material. An annular space is formed at that end of the ring remote from the valve member and between the two sealing means. A duct controlled by a check valve establishes communication between this space and one side of the valve, whereby when this side of the valve corresponds to the upstream side, line pressure is applied to said space to urge the ring toward the valve member. Means is also provided for introducing a viscous sealant into said space to hydraulically jack the ring against the valve member, thus providing a secondary seal by direct contact between the ring and the valve surface. In one embodiment means is provided to avoid excessive jacking pressure. Preferably the sealing means formed of resilient material, which is carried by the other end of the ring, is constructed to provide sealing contact with the valve surface on two concentric areas. Also in one embodiment the space between these two sealing areas is utilized for detecting valve leakage, and in another embodiment means is provided for introducing plastic sealant into this space.

Additional objects and features of the invention will appear from the following description in which the preferred embodiments have been set forth in detail in conjunction with the accompanying drawing.

DESCRIPTION OF THE PREFERRED EMBODIMENTS

Figure 1:
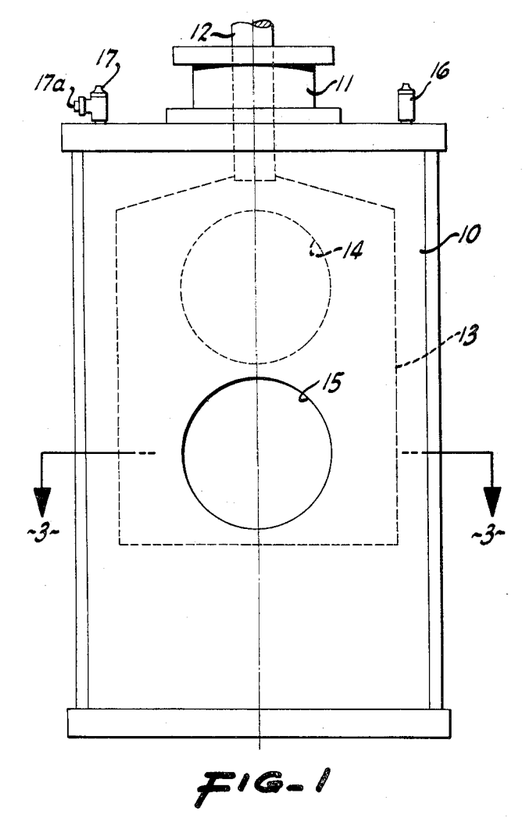
FIG. 1 is an end view illustrating a valve of the gate type, in which the invention is incorporated.
Figure 2:
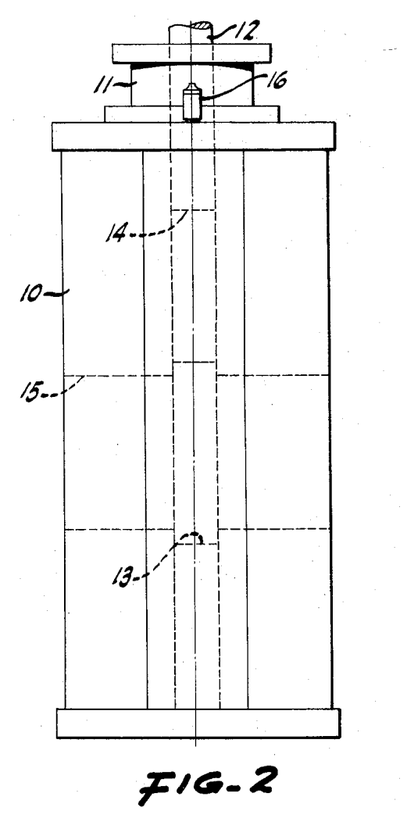
FIG. 2 is a side elevational view of the valve shown in FIG. 1.

The gate valve illustrated in FIGS. 1 and 2 is of the type having a box-like body together with a flat or slab type gate. The box-like body 10 can be fabricated by welding, and is provided with an upper bonnet assembly 11 through which the valve stem or operating rod 12 extends. The slab-like gate 13 within the body may be provided with a port 14 which registers with the aligned flow passages 15 for open position of the valve. Instead of providing this type of ported gate, it is possible to provide a simple flat gate, in which event the valve may be somewhat shorter in length. Certain fittings 16 and 17 are shown carried by the top of the body for purposes to be presently described.

Figure 3:
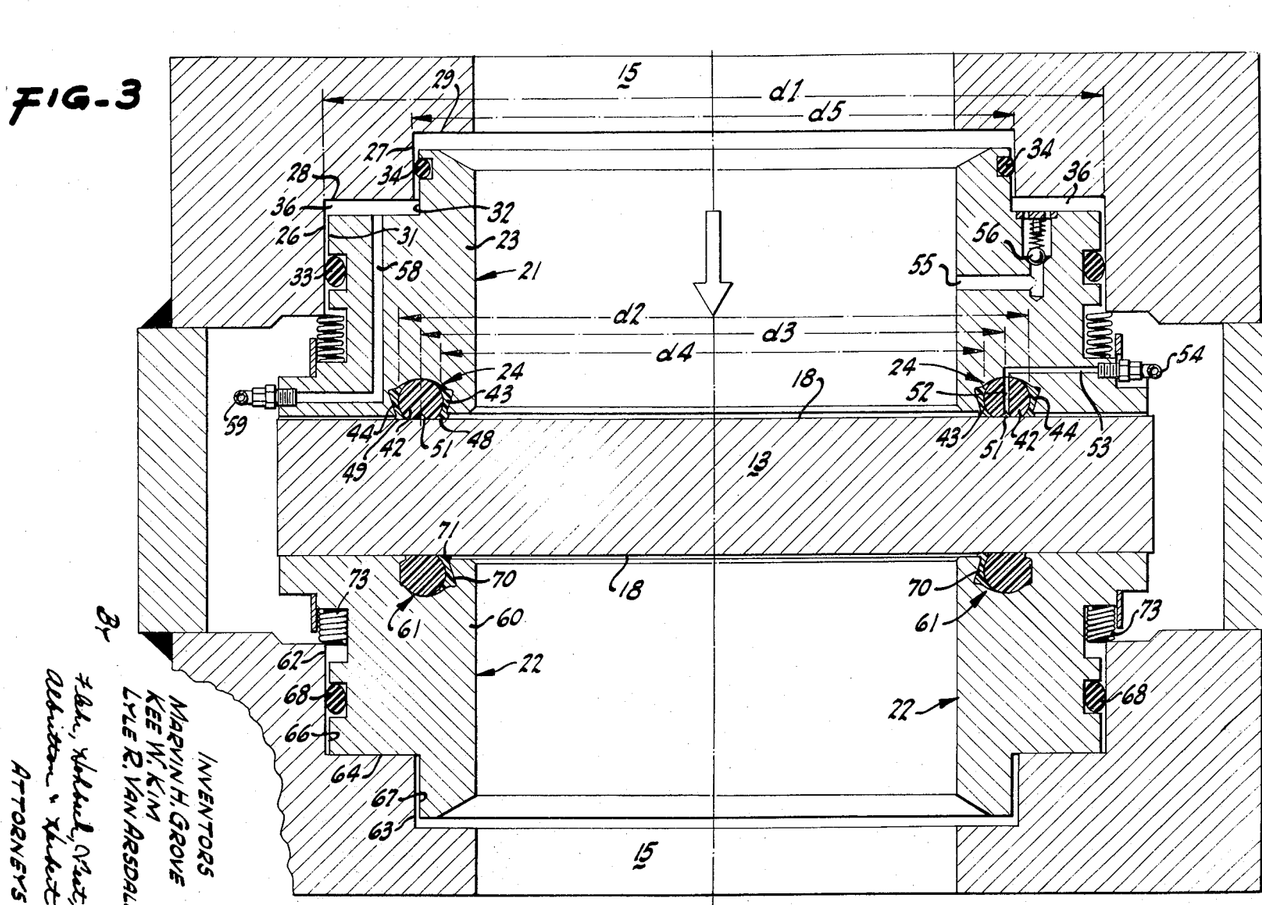
FIG. 3 (sheet 2) is a cross-sectional view taken along the line 3 — 3 of FIG. 1.

FIG. 3 shows the gate 13 in the closed position between the flow passages 15. The parallel side surfaces 18 of the gate are finished to provide valve working surfaces which cooperate with the valve sealing means. The two sealing assemblies 21 and 22 are disposed upon opposite sides of the gate and are carried by adjacent portions of the body. These sealing assemblies are annular and surround the flow passages 15.

The assembly 21 consists of a relatively rigid ring 23 which can be formed of suitable metal. One end portion of this ring carries sealing means 24 formed of resilient material, which establishes sealing engagement with the adjacent valve surface 18. The body is machined to provide a recess defined by the two cylindrical peripheral surfaces 26 and 27, which are on different diameters. Also this recess is defined by the flat annular surfaces 28 and 29. The ring is formed to provide the corresponding peripheral surfaces 31 and 32 which slidably interfit the surfaces 26 and 27. Suitable sealing means 33, such as a resilient O-ring, establishes a peripheral seal with the surface 26. A corresponding sealing means 34 in the form of a resilient O-ring establishes sealing engagement with the peripheral surface 27 whereby in effect two peripheral seals on different diameters are formed between the ring and the body.

The construction described above provides a closed annular space 36 between the body and the ring, and between the peripheral seals 33 and 34.

Figure 4:
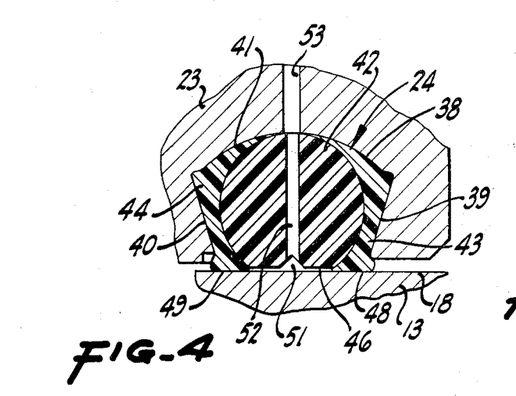
FIGS. 4 and 5 (sheet 1) are enlarged details in section showing the resilient sealing means of FIG. 3.

A suitable sealing assembly 24 is shown in detail in FIG. 4. It is constructed as shown in said copending U.S. Pat. application Ser. No. 17,365. The ring 23 is provided with an annular recess 38 which is defined by the inner and outer peripheral surfaces 39 and 40, and the bottom surface 41. In section the configuration is such that the surfaces 39 and 40 are divergent toward the bottom surface 41. This recess accommodates a ring 42 made of relatively hard resilient material such as nylon having a durometer hardness of the order of 85 to 90 (D scale). In addition, members 43 and 44 are disposed between the nylon ring 42 and the surfaces 39 and 40, and are made of relatively soft resilient material such as a suitable synthetic rubber or elastomer having a durometer hardness of the order of 60 to 85 (A scale). During assembly of the sealing means the members 43 and 44 are compressed in a radial direction, thus serving to retain the nylon member 42 together with the members 43 and 44 within the accommodating recess. Suitable cement is also applied during assembly to bond the several parts to the surfaces of the recess. In the finished assembly shown in FIG. 4 the surface 46 of the nylon ring is offset forwardly with respect to the surface 47 of the ring 23, and the faces 48 and 49 of the more resilient members 43 and 44 are offset forwardly a slight amount in advance of the nylon surface 46. An annular relief recess 50 is formed in the face of ring 23 adjacent the resilient member 44. In normal operation of the valve, the portions of the resilient members 43 and 44 forming the faces 48 and 49 are compressed until the planes of these faces are coincident with the plane of face 46 of the nylon ring 42. Under these conditions, the seals are formed on two concentric areas, one between the face 48 and the valve surface 18, and the other between the face 49 and the same valve surface.

The face 46 of the nylon ring 42 is provided with an annular groove 51 which preferably communicates with one or more ducts 52 extending through the nylon. For certain purposes to be presently described, this duct is placed in communication with the fitting 16 on the exterior of the valve, through duct 53 in the ring 23 and a metal tube 54 in the valve body which extends to the fitting 16.

A characteristic of the sealing means described above is that it is self-relieving with respect to pressure build-up between the sealing faces 48 and 49. Thus assuming that the upstream side of the valve connects with the upper flow passage 15, a seal against line pressure is established on face 48. If any substantial build-up should occur between the faces 48 and 49 due to some leakage past the face 48, then when such pressure build-up exceeds a predetermined value, it is permitted to escape past the face 49 since this face is self-relieving. Conversely, if the high pressure side is applied to the body cavity side, such pressure is resisted by the sealing face 49, and any leakage past this face accompanied by build-up of pressure between the faces 48 and 49 is relieved past the face 48.

The annular space 36 is in communication with one of the flow passages through the duct 55 and the check valve 56. The check valve permits fluid flow or application of fluid pressure from the flow passage into the space 36, but prevents flow in an opposite direction.

Means are provided for introducing a plastic material into the annular space 36 whereby it is possible to hydraulically jack the ring 23 against the gate. Thus the annular space 36 is in communication with a duct 58 in the ring 23, and this duct is connected by tube 59 to the exterior fitting 17. When a material of plastic consistency is introduced under pressure through fitting 17, as for example a plastic lubricant or sealant, then pressure build-up in space 36 causes the ring 23 to be hydraulically jacked against the gate. The jacking force can be sufficient to force the ring 23 into metal-to-metal engagement with the gate, thus providing a secondary seal which can be used to prevent excess leakage in the event the resilient sealing means becomes damaged or otherwise injured.

Certain dimensions are indicated in FIG. 3. The diameter $d1$ for the peripheral surface 26 is considerably larger in diameter than that of the resilient sealing means. The indicated diameter $d2$ represents the mean diameter of the annular sealing area formed by the resilient face 49. The indicated diameter $d3$ is the intermediate diameter of the resilient sealing means. The indicated diameter $d4$ is the mean diameter of the peripheral surface 27. Diameter $d5$ is the same as the diameter $d3$ and corresponds with the mean effective diameter of the sealing means.

Assuming that the ring 23 is being acted upon by upstream line pressure applied to the upper flow passage 15 of FIG. 3, then the pressure differential acting upon the ring 23 serves to urge this ring against the gate, since it acts upon an annular pressure area present because of the difference in diameters between the sealing face 48 and the diameter $d5$.

The other sealing assembly 22 likewise makes use of a ring 60 which is provided with resilient sealing means 61 which engages the gate 13. Here again the body is machined to provide the peripheral surfaces 62 and 63, together with the flat annular shoulder surface 64. The ring 60 has peripheral surfaces 66 and 67 which slidably interfit the surfaces 62 and 63. Sealing means 68, such as a resilient O-ring, serves to establish a seal between ring 61 and the body.

Figure 5:
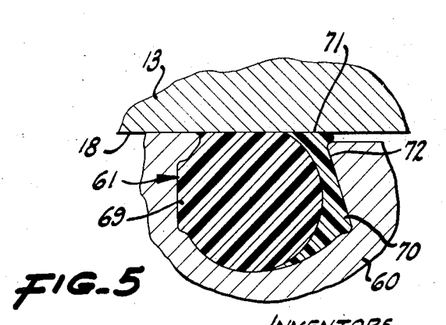

The sealing means 61 for the ring 60 is somewhat similar to the sealing means for the ring 23, but preferably is somewhat simplified. As illustrated in FIG. 2, it consists of a nylon ring 69 together with a more resilient member 70 disposed within the recess 72. Member 70 is under radial compression to retain the assembly within the recess. The annular face 71 of the resilient member 70 is normally pressed into sealing contact with the adjacent valve surface 18 of the gate. The seal formed by face 71 is self-relieving with respect to body pressure, but seals against pressure differential applied from the associated fluid passage way. The ring 60 is normally urged toward the gate by the circumferentially disposed compression springs 73.

Under certain conditions the pressure of plastic material in space 36 may become excessive, as for example reversal of line pressure or development of excessive pressure while the plastic material is being introduced through fitting 17. Therefore this fitting is shown provided with a pressure relief valve 17a which permits escape of some lubricant if the pressure becomes excessive.

Operation of the valve can be best explained by reference to FIGS. 3, 6 – 8. In FIG. 3 it is assumed that line pressure is being applied to the passage 15 in the upper part of the view whereby the thrust of line pressure upon the gate is carried by the downstream ring 60, with this ring being in abutment with the body shoulder 64. Upstream line pressure is applied through the duct 55 and the check valve 56 to the space 36, and this pressure urges the ring 23 toward the gate. On the downstream side any build-up of body cavity pressure may relieve itself past the resilient sealing faces 48 and 49. This is by virtue of the difference between diameters $d1$ and $d2$ which provides a fluid pressure area which acts upon the seat ring 23 to urge it away from the gate 18. In the event one wishes to determine whether or not any leakage is occurring between the gate and the upstream sealing means, the fitting 16 at the exterior of the valve may be vented to the atmosphere for a short period sufficient to reduce any pressure build-up between the faces 48 and 49 to atmospheric, after which it is closed and connected to means (i.e., a pressure operated switch controlling a signal circuit) capable of detecting any build-up of pressure. if a pressure build-up should occur, it indicates some leakage past the sealing means. It may be explained in this connection that sufficient pressure build-up may occur between the sealing faces 48 and 49 to operate a detecting device such as a pressure operated electrical switch.

Under certain operating conditions it may be desirable to introduce a viscous sealant into the fitting 16 whereby the sealant is caused to flow into and about the groove 51 to provide a viscous sealant between the sealing faces 48 and 49. This serves to facilitate maintenance of a desired tight seal where for certain reasons the resilient faces 48 and 49 are not effective to establish the seal desired.

Figures 6, 7:
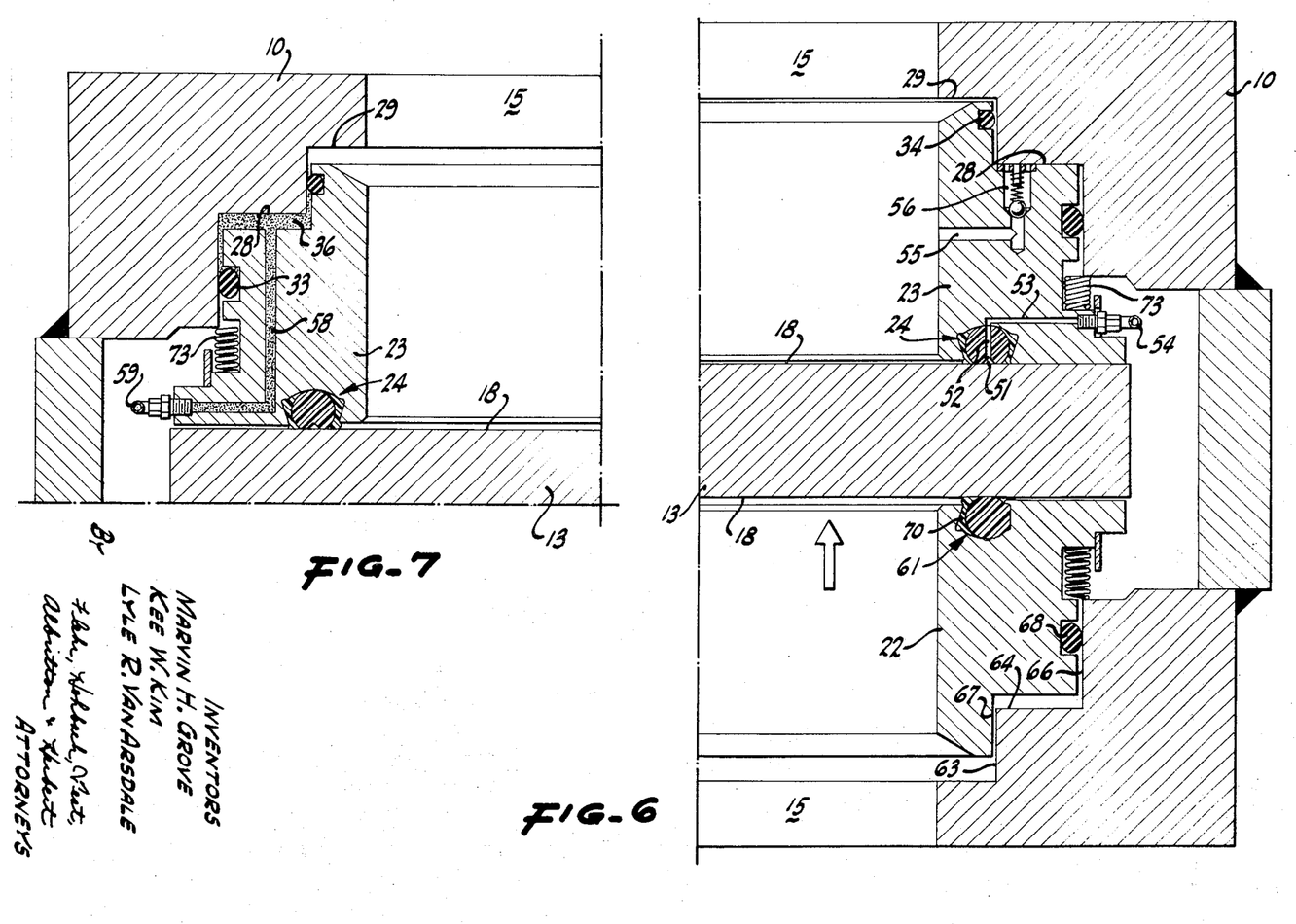
FIGS. 6 - 8 inclusive are detail views in section similar to a portion of FIG. 3, but showing the parts in different operating positions.
Figure 8:
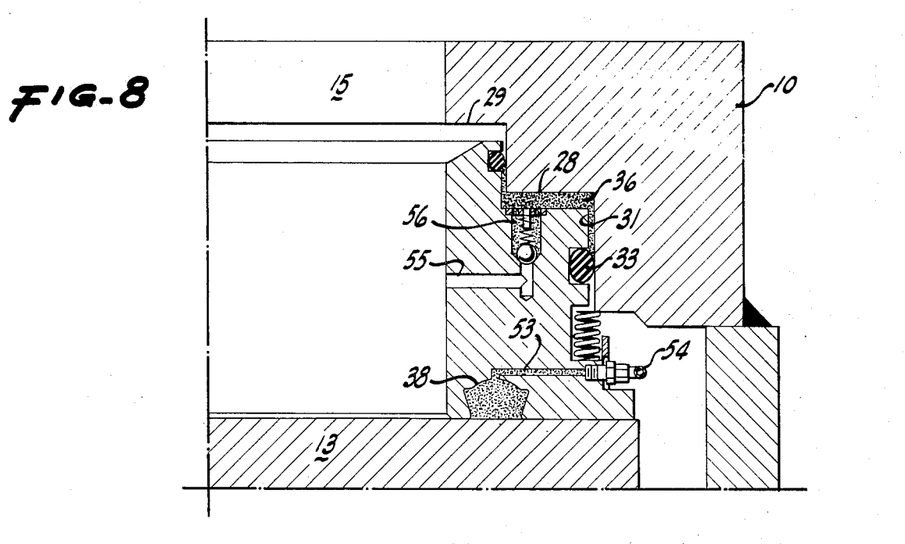

FIG. 6 illustrates the positioning of the parts when line pressure on the valve is reversed. In other words, in this view it is assumed that the upstream side of the valve is the lower part shown in this view. Under such conditions, the ring 60 is forced against the gate and a seal is maintained between the gate and the sealing means 61. Line pressure also forces the gate against the ring 23, and the thrust of the gate is taken by the ring in abutment with the shoulder surface 28 of the body.

In FIG. 7, the upstream side is the same as in FIG. 3, but in this instance it is assumed that a plastic sealant or like plastic material has been introduced under pressure into the space 36, thus hydraulically jacking the ring 23 against the gate. In the event the pressure of the sealant tends to be excessive, some is bled off through the pressure operated relieve valve 17.

In FIG. 8 the parts are again shown in substantially the same positions as in FIG. 3. However, in this instance it is assumed that the parts of the resilient seal have become disrupted and dislodged from the accommodating recess. Under such conditions a secondary seal is maintained by introducing a plastic sealant under pressure into the annular space 36, and also by introducing a plastic sealant into the recess 38 which normally accommodates the resilient members of the sealing means.

Figure 9:
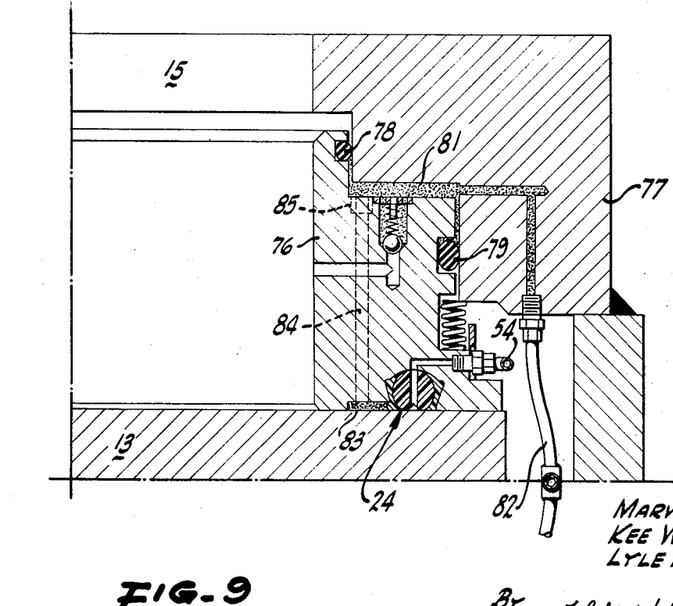
FIG. 9 is a detail in section similar to FIG. 8 but showing another embodiment.

FIG. 9 shows an assembly in which the sealant introduced under pressure provides both jacking force and sealing against leakage. In this instance the ring 76 is sealed on two diameters with respect to the body 77 by the resilient O-rings 78 and 79, thereby forming a space 81. This space connects with tube 82 which extends to fitting 17. The sealing means 24 is the same as in FIG. 3. However, the face of ring 76 near the inner periphery of sealing means 24 is formed to provide the annular recess 83 which is adapted to receive a plastic sealant. This recess communicates with space 81 through duct 84. A similar assembly may be on the other side of the gate with its space 81 likewise connected with fitting 17 or to a separate like fitting. A check valve 85 permits flow of sealant through duct 84 but closes against back flow of line pressure.

Figure 10A:
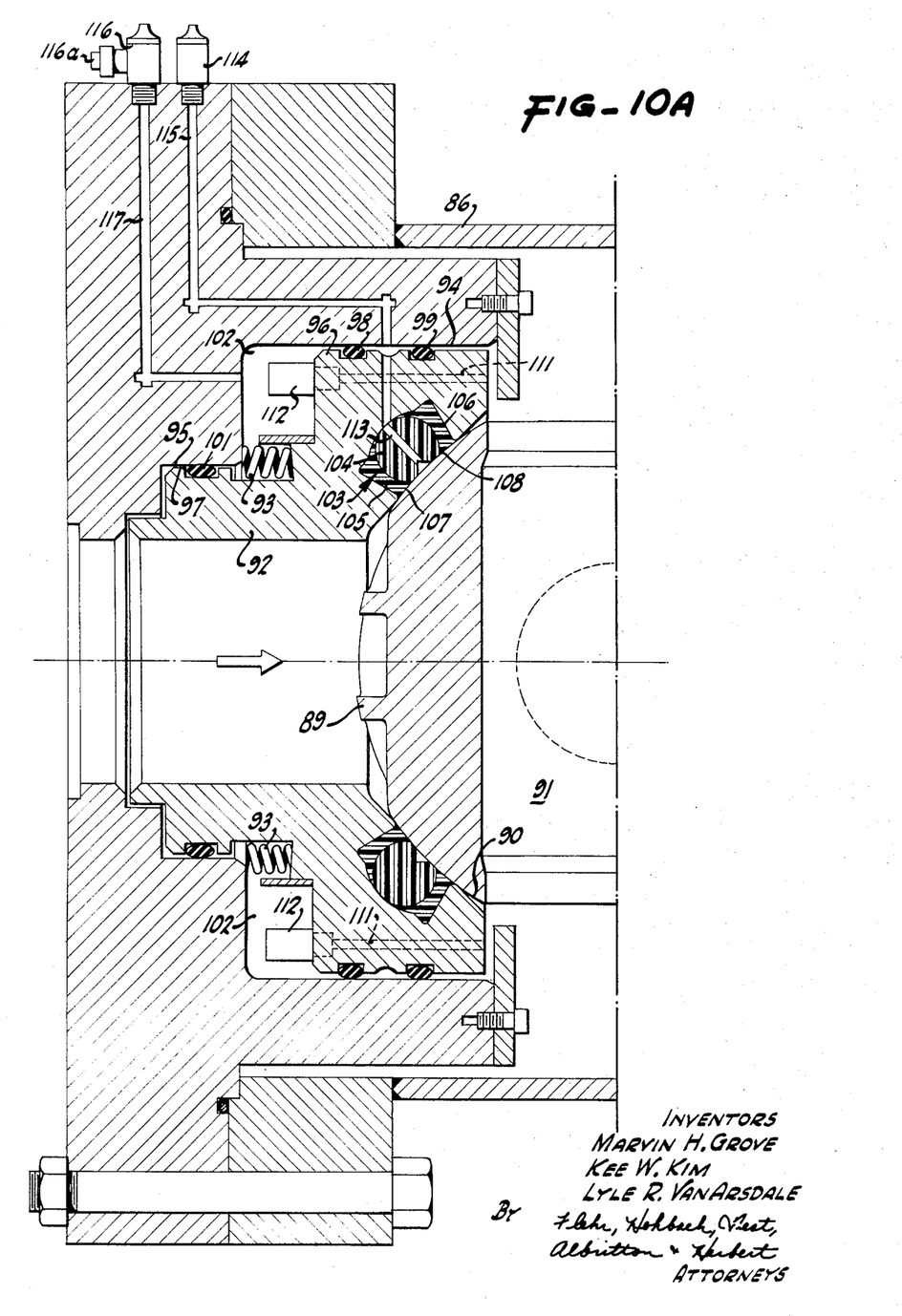
FIGS. 10A and 10B taken together form an elevation in section illustrating a valve of the ball type incorporating the invention.
Figure 10B:
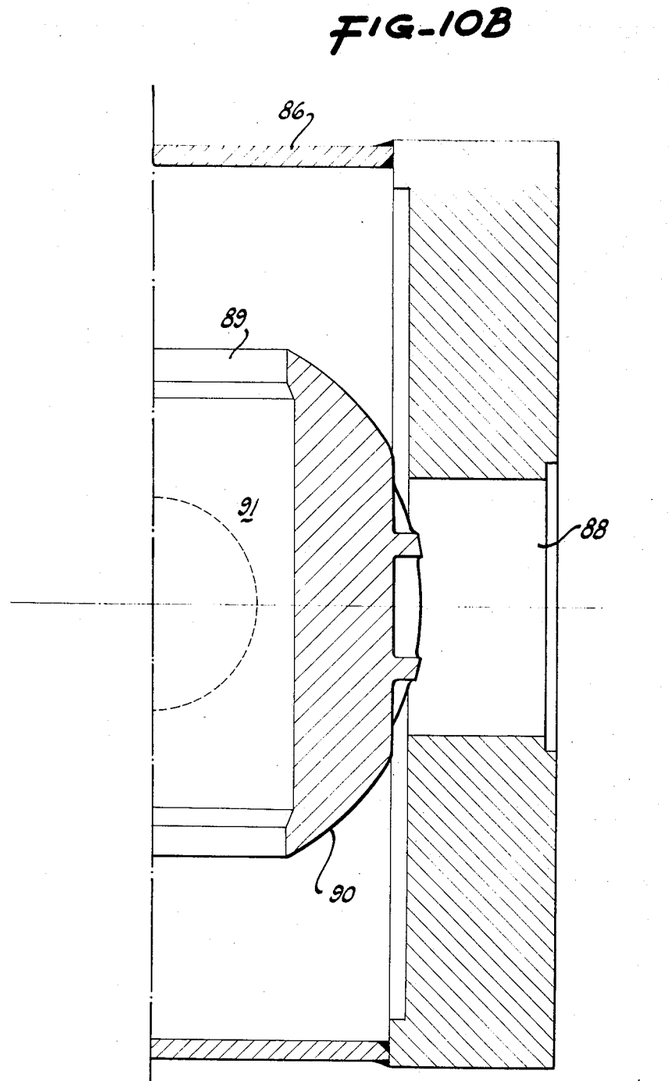

FIGS. 10A and 10B illustrate a valve of the ball type incorporating certain features of the invention. In this instance the valve body 86 is provided with the flow passages 87 and 88, and the valve member is in the form of a rotatable ball 89 formed with at least one valve surface 90 corresponding to the surface of a sphere. The ball is provided with a central passage 91 which communicates with the flow passages 87 and 88 for full open position of the valve. It is assumed that the axis of rotation of the ball is horizontal. The ends of the ball (not shown) are journalled by suitable trunnions and an operating shaft extends from one end of the ball through a suitable bonnet.

The ring 92 of the sealing assembly is carried by the body and is urged toward the ball by the circumferentially spaced compression springs 93. The machining of the body provides the two peripheral surfaces 94 and 95 on two diameters, and the ring has peripheral surfaces 96 and 97 which interfit the surfaces 94 and 95. Spaced sealing means 98 and 99, such as seals of the resilient O-ring type, provide seals between the ring and the surface 94, and the sealing means 101 of the resilient O-ring type forms a seal between the ring and the surface 95. This forms the closed annular space 102 corresponding with the space 36 of FIG. 3.

The resilient sealing means 103 carried by the ring 92 is constructed similar to the resilient sealing means of FIG. 3, except that the arrangement is such as to seal upon the spherical valve surface 90. Thus the sealing means includes the nylon ring 104 together with the more resilient members 105 and 106, which are compressed and which provide the sealing faces 107 and 108.

The ring 92 is provided with one or more ducts 111 each of which communicates with the space 102 through a check valve 112. The duct 113 in the nylon ring 104 is in communication with an exterior fitting 114 through the duct 115. Also the annular space 102 is in communication with a fitting 116 through the duct 117.

It will be noted that the diameter of surface 94 is substantially larger than the mean diameter of the sealing means 103, and that the mean diameter of the sealing means 103 is substantially the same as the diameter of surface 95.

Assuming that the passage 87 is the upstream side of the valve, line pressure acting upon an area present because of the difference between the diameter of the resilient face 107 and the diameter of surface 95 causes the ring 92 to be urged toward the ball with this force supplementing the force of springs 93. If the line pressure is reversed, or in other words, if line pressure is applied to the passage way 88 and the body cavity, then such pressure is transmitted through the ducts 111 and the check valves 112 and acts upon an effective pressure area present by virtue of the difference between the diameter of sealing surface 95 and the resilient sealing face 108. Thus for application of line pressure to either side of the valve, differential pressure applied to the ring 92 serves to urge it against the ball, thus supplementing the force of the compression springs 93.

In the event operating conditions make it desirable to jack the ring 92 against the ball, a plastic sealant is introduced through fitting 116 under sufficient pressure to act upon the fluid pressure area existing by virtue of the difference in diameters of surfaces 94 and 95. Thus by applying the plastic sealant under pressure, the ring 92 can be jacked with considerable force against the ball, thus establishing a secondary seal between the adjacent metal faces of the ring 92 and the valve surface 90 of the ball. A pressure relief valve 116a can be provided for the same purposes as the relief valve 17a of FIG. 1.

The fitting 114 can be used in the same manner as described in connection with FIG. 3. One may determine whether or not the valve is leaking by briefly venting through fitting 114 and then connecting the fitting to a detecting device which will detect any rise in pressure. Also lubricant can be introduced for the purpose of aiding maintenance of a seal by the sealing means 103. Finally, in the event the members of the sealing means 103 become completely dislodged, a plastic sealant can be introduced through fitting 114 for the purpose of filling the recess with the sealant, thus establishing a secondary seal.

Because the valve ball 89 is carried by trunnions, it is possible and desirable to proportion the ring 92 and the valve surface 90 whereby during normal operation these portions are separated from direct metal to metal contact. This makes for reduced operating torque wear between the adjacent metal surfaces. Jacking forces, however, may be sufficient to bring the metal surfaces into direct contact.

We claim:

1. In a valve construction, a valve body having aligned flow passages, a valve member within the body and movable between open and closed positions relative to the flow passages, the valve member having at least one valve surface formed on the same surrounding one of the flow passages for closed position of the valve, an annular sealing assembly carried by the body and surrounding said one flow passage, said sealing assembly including a relatively rigid metal ring carried by the body, sealing means formed of resilient material carried by one end portion of the ring and disposed to contact and seal with respect to the adjacent valve surface of the valve member, said body having two peripheral surfaces formed on different diameters, said ring also having two peripheral surfaces on different diameters, the peripheral surfaces of the ring and the peripheral surfaces of the body being dimensioned slidably to interfit with the ring being capable of limited movement toward and away from the valve member, means forming two fluid seals between the interfitting peripheral surfaces, whereby seals are provided between the ring and the body on two different diameters, there being a closed annular space between that end of the ring remote from the valve member and the body and between the two sealing means, a duct formed in said ring and serving to establish communication between said annular space and one of the flow passages of the body, a check valve for controlling fluid flow through said duct and carried by said ring, said check valve permitting application of pressure through said duct into said space from one of said flow passages, and to prevent flow through said duct from said space, said ring together with said peripheral seals and said sealing means forming a fluid pressure area whereby when line fluid is applied through said duct and check valve into said space from one flow passage, said ring is urged by such fluid pressure toward the valve member, and means for introducing a plastic material into said annular space under pressure to force the ring against the valve member.

2. A valve construction as in claim 1 in which the valve is of the gate type and in which a second annular sealing assembly is provided, said second assembly being carried by the body and having sealing means of resilient material in sealing contact with the gate, said assemblies being disposed on opposite sides of the gate.

3. A valve construction as in claim 1 in which the valve is one of the ball type with the valve surface conforming generally to a sphere.

4. A valve construction as in claim 1 together with means for supplying a plastic sealant to the valve surface of the valve member adjacent said resilient sealing means.

* * * * *